United States Patent
Liu et al.

(10) Patent No.: US 10,921,632 B2
(45) Date of Patent: Feb. 16, 2021

(54) DISPLAY PANEL AND TERMINAL DEVICE FOR FORMING STRUCTURED LIGHT

(71) Applicants: Hefei BOE Optoelectronics Technology Co., Ltd., Hefei (CN); BOE TECHNOLOGY GROUP CO., LTD., Beijing (CN)

(72) Inventors: Xiaopeng Liu, Beijing (CN); Jun Xu, Beijing (CN)

(73) Assignees: Hefei BOE Optoelectronics Technology Co., Ltd., Hefei (CN); BOE TECHNOLOGY GROUP CO., LTD., Beijing (CN)

( * ) Notice: Subject to any disclaimer, the term of this patent is extended or adjusted under 35 U.S.C. 154(b) by 28 days.

(21) Appl. No.: 16/433,796

(22) Filed: Jun. 6, 2019

(65) Prior Publication Data

US 2020/0089034 A1   Mar. 19, 2020

(30) Foreign Application Priority Data

Sep. 13, 2018   (CN) .......................... 2018 1 1069207

(51) Int. Cl.
*G02F 1/1335* (2006.01)
*G06K 9/00* (2006.01)

(52) U.S. Cl.
CPC ... *G02F 1/133512* (2013.01); *G06K 9/00221* (2013.01); *G06K 9/00288* (2013.01)

(58) Field of Classification Search
None
See application file for complete search history.

(56) References Cited

U.S. PATENT DOCUMENTS

2019/0235311 A1* 8/2019 Lee .................. G02F 1/133512
2019/0391458 A1* 12/2019 Chen ........................ G02F 1/29
2020/0064686 A1* 2/2020 Jiang ................ G02F 1/133528

* cited by examiner

*Primary Examiner* — Thanh Nhan P Nguyen
(74) *Attorney, Agent, or Firm* — Thomas|Horstemeyer, LLP

(57) ABSTRACT

A display panel includes: a backlight module configured to generate a visible light; a display module including an array substrate formed on the backlight module, a color filter substrate opposite to the array substrate, and a first liquid crystal layer between the array substrate and the color filter substrate. The color filter substrate includes a plurality of color resist blocks and a black matrix between adjacent color resist blocks, the black matrix having a first layer and a second layer on a side of the first layer facing the array substrate. The second layer is configured to generate an invisible light under excitation of the visible light, and the first layer is configured to block transmission of the visible light and to allow transmission of the invisible light. A light collimating structure is positioned on a side of the color filter substrate away from the array substrate.

20 Claims, 2 Drawing Sheets

DISPLAY PANEL AND TERMINAL DEVICE FOR FORMING STRUCTURED LIGHT

CROSS-REFERENCE TO RELATED APPLICATIONS

The present application claims the benefit of and priority to Chinese Patent Application No. 201811069207.9 filed Sep. 13, 2018, the entire contents of which are incorporated herein by reference.

TECHNICAL FIELD

The present disclosure relates to the technical field of displays and, in particular, to a display panel and a terminal device.

BACKGROUND

With the development of communication technology, mobile devices, computers, and other terminal devices have become indispensable communication devices in people's daily life, and their confidentiality and security have received more and more attention. Due to its advantages of convenient operation and high security, facial recognition technology is gradually applied to terminal devices, such as system unlocking, secure payment, and application login.

In the related art, a Vertical Cavity Surface Emitting Laser (VCSEL) is generally used in combination with a scanning device to realize signal modulation of emitted light, thereby implementing a facial recognition technology. However, this increases production costs and, in addition, brings about various problems, such as increased volume and heat dissipation, and degradation of the user experience.

It should be noted that the information disclosed in the Background section above is only for enhancement of understanding of the background of the present disclosure, and thus may include information that does not constitute prior art known to those of ordinary skill in the art.

SUMMARY

According to a first aspect of the present disclosure, a display panel is provided, including:

a backlight module configured to generate a visible light;

a display module including an array substrate formed on the backlight module, a color filter substrate disposed opposite to the array substrate, and a first liquid crystal layer disposed between the array substrate and the color filter substrate, wherein the color filter substrate includes a plurality of color resist blocks and a black matrix between adjacent color resist blocks, where the black matrix has a first layer and a second layer formed on a side of the first layer facing the array substrate, the second layer is configured to generate an invisible light under excitation of the visible light, and the first layer is configured to block transmission of the visible light and to allow transmission of the invisible light; and a light collimating structure formed on a side of the color filter substrate away from the array substrate and configured to collimate the invisible light transmitted through the second layer to form a structured light.

In an example embodiment of the present disclosure, the light collimating structure includes:

a first substrate formed on the display module;

a first electrode formed on a side of the first substrate away from the display module;

a second substrate disposed opposite to the first substrate;

a second electrode formed on a side of the second substrate facing the first substrate; and a second liquid crystal layer disposed between the first electrode and the second electrode, wherein liquid crystal molecules in the second liquid crystal layer are configured to be arranged in a lenticular structure when the first electrode and the second electrode are energized to collimate the invisible light transmitted through the second layer.

In an example embodiment of the present disclosure, the liquid crystal molecules in the second liquid crystal layer are configured to be arranged in a matrix structure when the first electrode and the second electrode are not energized.

In an example embodiment of the present disclosure, in a projection obtained in a thickness direction of the display panel, a focus of the lenticular structure is located on the second layer.

In an example embodiment of the present disclosure, the invisible light generated by the second layer is a point light source, and the focus of the lenticular structure coincides with the point source.

In an example embodiment of the present disclosure, the second layer is a quantum dot layer, and the quantum dot layer is configured to generate an infrared light under excitation of the visible light.

In an example embodiment of the present disclosure, the visible light includes a blue light portion, and the quantum dot layer is configured to generate an infrared light under excitation of the blue light portion.

In an example embodiment of the present disclosure, the first layer is a germanium crystal layer, and the germanium crystal layer is configured to block the visible light from transmitting and transmit the infrared light.

In an example embodiment of the present disclosure, the light collimating structure is bonded with an optical glue to a side of the color filter substrate away from the array substrate.

According to a second aspect of the present disclosure, a terminal device is provided, including:

the display panel according to any one of the above, wherein the display panel is configured to project a structural light generated by the display panel onto an object under detection; and a camera disposed on the display panel, and configured to image the structural light projected on the object under detection to obtain a three-dimensional model of the object under detection.

It should be understood that both the foregoing general description and the following detailed description are examples and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure. Understandably, the drawings in the following description only illustrate some embodiments of the present disclosure, and other drawings can be obtained from these drawings by those skilled in the art without any creative effort.

DETAILED DESCRIPTION

Figure 1:
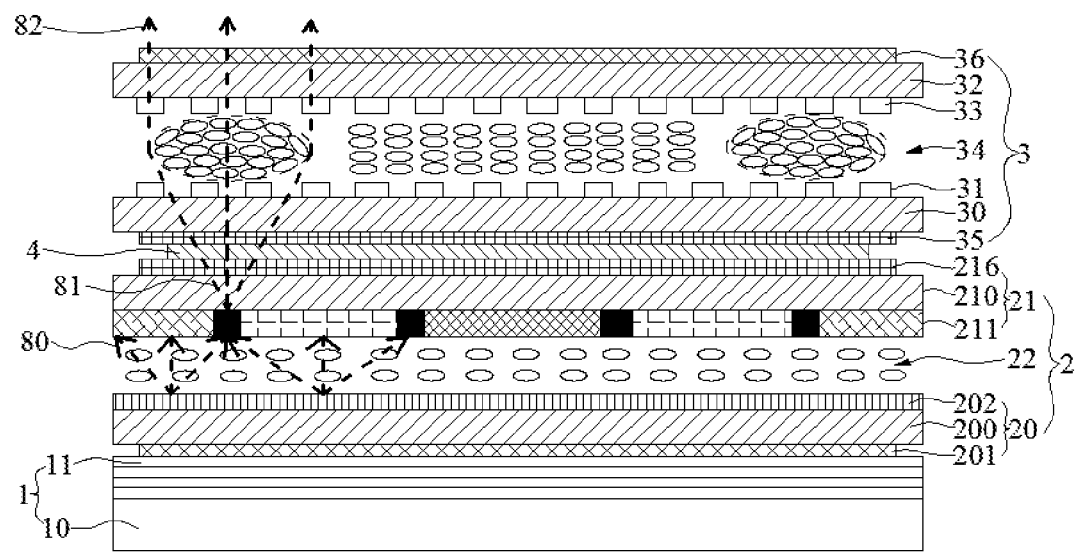
FIG. 1 is a schematic structural diagram of a display panel according to an embodiment of the present disclosure.

Example embodiments will now be described more fully with reference to the accompanying drawings. However, the example embodiments can be embodied in a variety of forms and should not be construed as being limited to the embodiments set forth herein. Rather, these embodiments are provided to make the present disclosure thorough and complete, and to fully convey the concept of the example embodiments to those skilled in the art. The same reference numerals in the drawings denote the same or similar structures, and thus their detailed description will be omitted.

Although the relative terms such as "upper" and "lower" are used in the specification to describe the relative relationship of one component to another component as illustrated, these terms are used in this specification for convenience only, for example, according to the direction illustrated in the accompanying drawings. It will be understood that if the device as illustrated is flipped upside down, the component described as "upper" will become the component "below". When a structure is "on" other structure, it may mean that a structure is integrally formed on other structure, or that a structure is formed "directly" on other structure, or that a structure is formed "indirectly" on other structure through another structure.

The terms "a", "an", "the", "said", and "at least one" are used to indicate the presence of one or more elements, components, etc. and the terms "including" and "having" are used to mean non-exclusive inclusion, meaning there may be additional elements, components, etc. in addition to the listed elements, components, etc.

With the development of communication technology, mobile devices, computers, and other terminal devices have become indispensable communication devices in people's daily life, and their confidentiality and security have received more and more attention. Due to the advantages of convenient operation and high security, facial recognition technology is gradually applied to terminal devices, such as system unlocking, secure payment, and application login.

In the related art, a Vertical Cavity Surface Emitting Laser (VCSEL) is generally used in combination with a scanning device to realize signal modulation of emitted light, thereby implementing a facial recognition technology. However, this increases production costs and, in addition, brings about various problems, such as increased volume and heat dissipation, and degradation of the user experience.

As shown in FIG. 1 to FIG. 4, the embodiment of the present disclosure provides a display panel, which is applied to a terminal device 6 such as a mobile phone. The display panel may include a backlight module 1, a display module 2, and a light collimating structure 3.

Specifically, the backlight module 1 may include a light emitting device 10 and at least one optical film 11. The light emitting device 10 is configured to provide a visible light 80 required for the display module 2 to display an image, and the visible light 80 may include a red portion, a green portion, and a blue portion. The light emitting device 10 may be a cold cathode fluorescent lamp, a light emitting diode, or an organic electroluminescent device. As shown in FIG. 1, the optical film 11 is provided with a plurality of layers. The optical film 11 may be formed on the side of the light emitting device 10 facing the display module 2. The main function of the optical film 11 is to converge light to make the backlight module 1 produce uniform light.

The display module 2 may include an array substrate 20 formed on the backlight module 1, a color filter substrate 21 disposed opposite to the array substrate 20, and a first liquid crystal layer 22 disposed between the array substrate 20 and the color filter substrate 21.

The array substrate 20 may be transmitted by the visible light 80 generated by the backlight module 1. The array substrate 20 may include a first base substrate 200, a lower polarizer 201, and a thin film transistor 202. The first base substrate 200 may be a glass substrate. The lower polarizer 201 may be formed on a side of the first base substrate 200 away from the color filter substrate 21 and attached to the optical film 11 of the backlight module 1. The thin film transistor 202 may be formed on a side of the first base substrate 200 facing the color filter substrate 21 for driving liquid crystal molecules in the first liquid crystal layer 22 to be deflected to change the polarity of the visible light 80 generated by the backlight module 1.

The color filter substrate 21 may include a second base substrate 210, a color filter 211, and an upper polarizer 216. The second base substrate 210 may be a glass substrate. The upper polarizer 216 may be formed on a side of the second base substrate 210 away from the array substrate 20. The color filter 211 may be formed on a side of the second base substrate 210 facing the array substrate 20.

Figure 2:
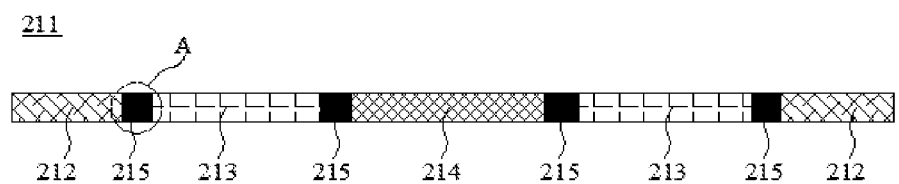
FIG. 2 is a schematic structural diagram of a color filter in the display panel illustrated in FIG. 1.

As shown in FIG. 2, the color filter 211 may include a plurality of color resist blocks and a black matrix 215. The plurality of color resist blocks may include a red color resist block 212, a green color resist block 213, and a blue color resist block 214. The red color resist block 212 may transmit a red portion of the visible light 80 generated by the backlight module 1; the green color resist block 213 may transmit the green light portion of the visible light 80 generated by the backlight module 1; and the blue color resist block 214 may transmit the blue light portion of the visible light 80 generated in the backlight module 1. The black matrix 215 may be located between adjacent color resist blocks. It should be understood that the adjacent color resist blocks may be color resist blocks of the same color or color resist blocks of different colors. The black matrix 215 may be used to prevent light leakage and prevent crosstalk between adjacent color resist blocks.

Figure 3:
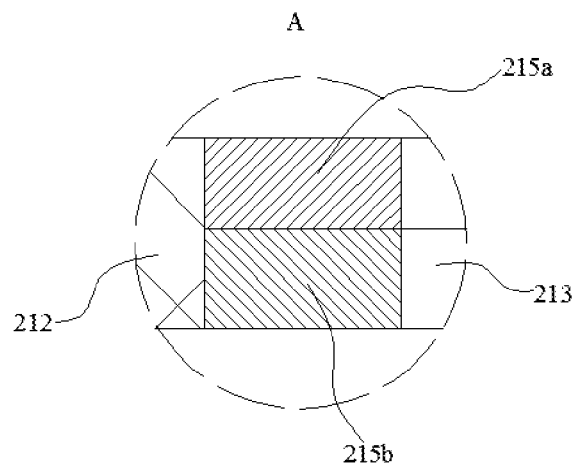
FIG. 3 is a schematic enlarged view of the portion A shown in FIG. 2.

It should be noted that the black matrix 215 in the present embodiment has a function of preventing light leakage and preventing crosstalk between adjacent color resist blocks, and the black matrix 215 may also have a function of converting the visible light 80 emitted by the backlight module 1 into an invisible light 81 and allowing the generated invisible light 81 to pass through. Specifically, as shown in FIG. 3, the black matrix 215 in this embodiment may have a first layer 215a and a second layer 215b. The first layer 215a may be formed on a side of the second base substrate 210 facing the array substrate 20. The second layer 215b may be formed on a side of the first layer 215a facing the array substrate 20. The second layer 215b is configured to generate the invisible light 81 under the excitation of the visible light 80 generated by the backlight module 1, and the first layer 215a is configured to block the transmission of the visible light 80 and to transmit the invisible light 81.

The first liquid crystal layer 22 may be located between the color filter 211 and the thin film transistor 202. The liquid crystal molecules in the first liquid crystal layer 22 may be deflected when the thin film transistor 202 is energized to change the polarity of the visible light 80 generated by the backlight module 1.

The light collimating structure 3 is formed on a side of the color filter substrate 21 away from the array substrate 20. The light collimating structure 3 is disposed to collimate the invisible light 81 transmitted through the second layer 215b to form a structured light 82.

For example, the light collimating structure 3 may be bonded with an optical adhesive 4 to a side of the color filter substrate 21 away from the array substrate 20. Specifically, the light collimating structure 3 and the upper polarizer 216 are bonded together with the optical adhesive 4. Thus, it can ensure the adhesion stability of the light collimating structure 3 and the color filter substrate 21, and also can allow light to pass therethrough.

Based on the foregoing, in the present embodiment, under the excitation of the visible light 80 generated by the backlight module 1, the second layer 215b of the black matrix 215 may generate invisible light 81, and the invisible light 81 generated by the second layer 215b may be transmitted through the first layer 215a of the black matrix 215 and collimated by the light collimating structure 3 to form the structured light 82. That is to say, in the present embodiment, the visible light 80 generated by the backlight module 1, the black matrix 215 of the display module 2, and the light collimating structure 3 in the display panel are cooperated to form the structured light 82. Compared with the related art in which the VCSEL laser is used in combination with scanning to realize the signal modulation of the emitted light, in the present disclosure, the use of VCSEL laser in the scanning device is reduced or eliminated, thereby reducing the production cost of the terminal device 6 and reducing the volume of the terminal device 6 to some extent. In this case, since the illumination of the additional VCSEL laser is not required, the heat generated during the use of the terminal device 6 may be reduced, and the situation in which the terminal device 6 is hot during use may be alleviated, thereby improving user experience.

In addition, in the present embodiment, by utilizing the visible light 80 in the backlight module 1 and the black matrix 215 of the display module 2 to generate the invisible light 81, on one hand, the light energy utilization rate can be improved, and on the other hand, utilization of the space of the display panel can be improved.

Figure 4:
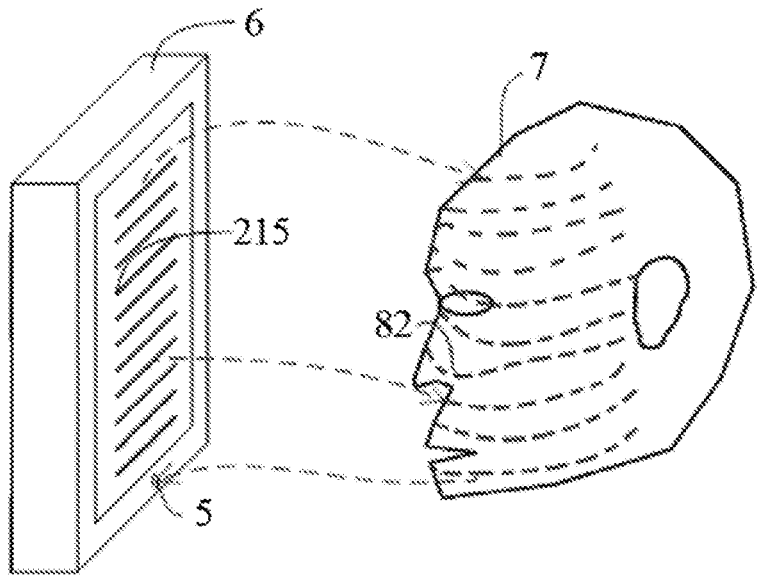
FIG. 4 is a schematic structural diagram of identifying a device under detection by a terminal device according to an embodiment of the present disclosure.
Figure 5:
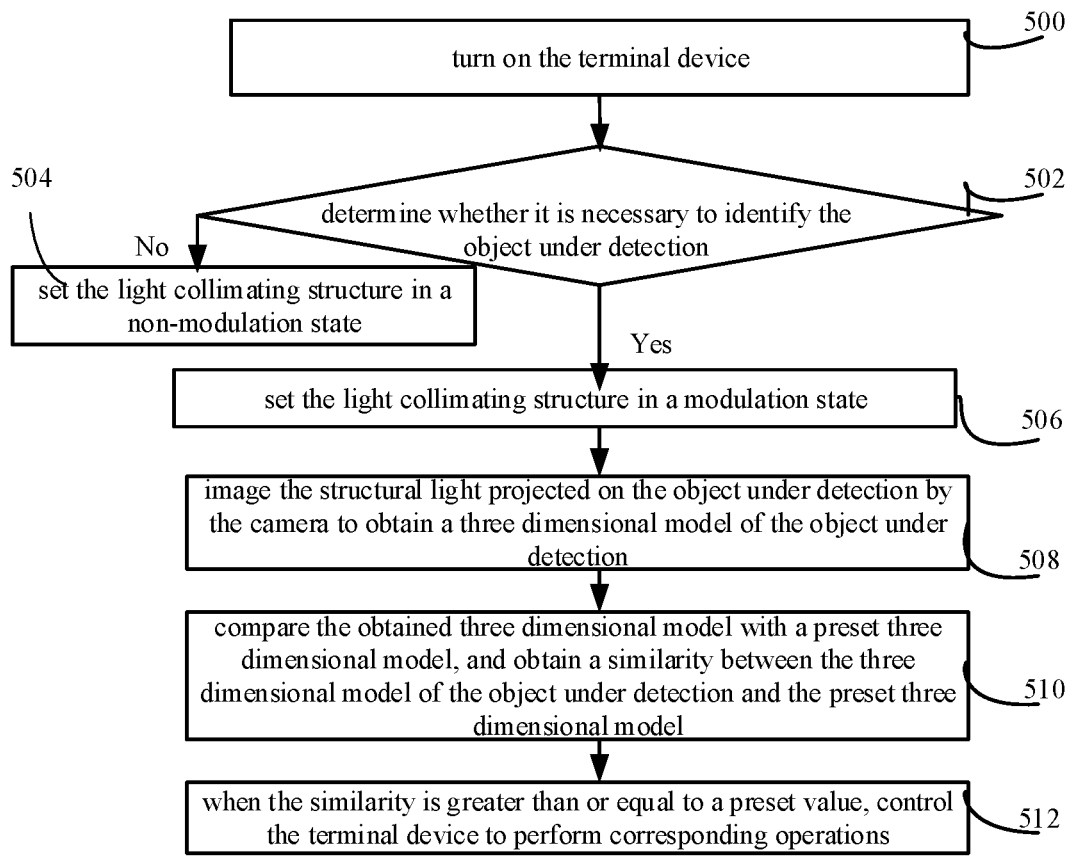
FIG. 5 is a flowchart of operations of a terminal device according to an embodiment of the present disclosure.

For example, the second layer 215b of the black matrix 215 may be a quantum dot layer, which may include atoms such as zinc, cadmium, selenium, and sulfur, and which may be made of a nanomaterial having a crystal diameter of 2-10 nm. The photoelectric characteristics are unique in that after photoelectric stimulation, pure monochromatic light of various colors can be emitted according to the diameter of the quantum dots, that is, the quantum dot layer can change the color of the light. The quantum dot layer is configured to generate infrared light under the excitation of visible light 80, that is, the structured light 82 generated in this embodiment is infrared structured light so that, when the structured light 82 is projected on an object 7 under detection so as to facilitate obtaining a three dimensional model of the object 7 under detection (for example, the face of the user, as shown in FIG. 4), since the structured light 82 is infrared structured light, the influence of the structured light 82 on the health of the user can be reduced, thereby improving the safety of the use of the terminal device 6.

In an embodiment, the quantum dot layer is configured to generate an infrared light under excitation of the blue portion of the visible light 80 to increase utilization of the blue portion of the visible light 80.

In addition, when the invisible light 81 generated by the visible light 80 exciting the quantum dot layer is an infrared light, the first layer 215a of the black matrix 215 may be a germanium crystal layer, and the germanium crystal layer is configured to block the visible light 80 generated by the backlight module 1 to pass through and allow the infrared light generated by the quantum dot layer to pass through.

In an embodiment, the light collimating structure 3 may be a liquid crystal panel. For example, the light collimating structure 3 may include a first substrate 30, a first electrode 31, a second substrate 32, a second electrode 33, and a second liquid crystal layer 34.

The first substrate 30 may be a glass substrate, and the first substrate 30 is formed on the display module 2. The first electrode 31 is formed on a side of the first substrate 30 away from the display module 2. The second substrate 32 may be a glass substrate, and the second substrate 32 is disposed opposite to the first substrate 30. The second electrode 33 is formed on a side of the second substrate 32 facing the first substrate 30, and the polarity of the second electrode 33 is opposite to the polarity of the first electrode 31. The second liquid crystal layer 34 is disposed between the first electrode 31 and the second electrode 33. The shapes of the liquid crystal molecules in the second liquid crystal layer 34 can be controlled by the first electrode 31 and the second electrode 33.

In an embodiment, the liquid crystal molecules in the second liquid crystal layer 34 are configured to be arranged in a lenticular structure (such as the structure in the elliptical dotted-line box in FIG. 1) when the first electrode 31 and the second electrode 33 are energized, so as to collimate the invisible light 81 transmitted through the second layer 215b to generate the structured light 82. That is, when the first electrode 31 and the second electrode 33 are energized, the light collimating structure 3 is in a modulation state, and the light collimating structure 3 may collimate the light as a lens structure to form the structured light 82. At this time, the display panel may cooperate with the camera 5 to obtain a three-dimensional model of the object 7 under detection. Also, the liquid crystal molecules in the second liquid crystal layer 34 are configured to be arranged in a matrix structure (such as the structure between two elliptical dotted-line boxes in FIG. 1) when the first electrode 31 and the second electrode 33 are not energized. The matrix structure is disposed in parallel between the first substrate 30 and the second substrate 32. At this time, the light collimating structure 3 is in a non-modulation state, and the light collimating structure 3 may be used as a flat glass to ensure the display effect of the display panel. This can facilitate the user watching the content displayed on the display panel.

From this, it is understood that the light collimating structure 3 in the present embodiment has a modulation state and a non-modulation state. When the display panel needs to cooperate with the camera 5 to obtain the three dimensional model of the object 7 under detection, the light collimating structure 3 may be switched to the modulation state and, when the display panel is only used for normal display, and does not need to cooperate with the camera 5 to obtain the three dimensional model of the object 7 under detection, the light collimating structure 3 may be switched to the non-modulation state.

When the light collimating structure 3 is in a modulation state, in the projection obtained in the thickness direction of the display panel, the liquid crystal molecules in the second liquid crystal layer 34 are arranged such that the focus of the lenticular structure is located on the second layer 215b so that, in such arrangement, the invisible light 81 generated by the black matrix 215 can be sufficiently collimated, which can improve the utilization of the invisible light 81 generated by the black matrix 215 and improve the collimating effect of the light collimating structure 3.

For example, the invisible light 81 generated by the second layer 215b of the black matrix 215 may be a point source. When the invisible light 81 generated by the second layer 215b of the black matrix 215 is a point light source, the lenticular structure of the liquid crystal molecules in the second liquid crystal layer 34 may be arranged with its focus coinciding with the point source by adjusting the energization of the first electrode 31 and the second electrode 33, to further increase the utilization of the invisible light 81 generated by the black matrix 215 and further improve the collimation effect of the light collimating structure 3.

The light collimating structure 3 may further include a first polarizer 35 and a second polarizer 36. The first polarizer 35 is formed on a side of the first substrate 30 facing the display module 2. The first polarizer 35 may be bonded to the upper polarizer 216 of the display module 2 with an optical adhesive 4 to make the light collimating structure 3 to be formed on the display module 2. The second polarizer 36 may be formed on a side of the second substrate 32 away from the first substrate 30.

It should be noted that the light collimating structure 3 and the display module 2 may also share a polarizer at the joint. That is, when the light collimating structure 3 is formed on the display module 2, one of the upper polarizer 216 of the display module 2 and the first polarizer 35 of the light collimating structure 3 can be omitted. Thus, it can reduce the thickness of the display panel while ensuring the normal display of the display panel.

In addition, as shown in FIG. 4, an embodiment of the present disclosure further provides a terminal device 6, which may be a mobile phone, a tablet computer, or the like.

The terminal device 6 may include a camera 5 and the display panel described in any of the foregoing embodiments. This display panel is arranged to project its own structured light 82 onto the object 7 under detection, which may be the face of the user. The camera 5 is disposed on the display panel. For example, the camera 5 may be embedded in the non-display area of the display panel, so that the volume of the terminal device 6 may be reduced to some extent without affecting the display of the display panel. The camera 5 is arranged to image the structured light 82 projected on the object 7 under detection to obtain a three dimensional model of the object 7 under detection.

It should be noted that if the structured light 82 generated by the display panel is an infrared structured light, the camera 5 may be an infrared camera 5.

In addition, it should be noted that the dotted arrow in FIG. 4 may represent the traveling direction of the structured light 82.

In an embodiment, the terminal device 6 may further include a control mechanism (not shown), and the control mechanism may be communicably connected to the display panel and the camera 5 for comparing the three dimensional model obtained by the camera 5 and a preset three dimensional model, that is, for identifying the object 7 under detection, to obtain a similarity between the three dimensional model of the object 7 under detection and the preset three dimensional model. When the similarity is greater than or equal to a preset value, the control mechanism may control the terminal device 6 to perform system operations such as system unlocking, secure payment, and application login.

For example, the operation steps of the terminal device 6 may include the following.

In Step S500, the terminal device 6 is turned on.

In Step S502, it is determined whether it is necessary to identify the object 7 under detection.

In step S504, when it is not necessary to identify the object 7 under detection, the light collimating structure 3 is set in a non-modulation state, that is, the first electrode 31 and the second electrode 33 in the light collimating structure 3 are not energized. At this time, the display panel displays the image normally.

In Step S506, when it is necessary to identify the object 7 under detection, the light collimating structure 3 is set in a modulation state, that is, the first electrode 31 and the second electrode 33 in the light collimating structure 3 are energized to make the liquid crystal molecules in the second liquid crystal layer 34 to be arranged in a lenticular structure to collimate the invisible light 81 generated by the black matrix 215, thereby generating a structured light 82.

In Step S508, the structural light 82 projected on the object 7 under detection is imaged by the camera 5 to obtain a three-dimensional model of the object 7 under detection.

In Step S510, the three-dimensional model obtained by the camera 5 is compared with a preset three-dimensional model in the terminal device 6, and a similarity between the three dimensional model of the object 7 under detection and the preset three dimensional model is obtained.

In step S512, when the similarity is greater than or equal to a preset value, the terminal device 6 is controlled to perform corresponding operations, for example, controlling system unlocking, secure payment, and application login of the terminal device 6.

Other embodiments of the disclosure will be apparent to those skilled in the art from consideration of the specification and practice of the disclosure disclosed herein. This disclosure is intended to cover any variations, uses, or adaptations of the disclosure following the general principles thereof and including such departures from the present disclosure as come within known or customary practice in the art. It is intended that the specification and examples be considered as example only, with a true scope and spirit of the disclosure being indicated by the following claims.

What is claimed is:

1. A display panel, comprising:
    a backlight module configured to generate a visible light;
    a display module comprising an array substrate on the backlight module, a color filter substrate opposite to the array substrate, and a first liquid crystal layer between the array substrate and the color filter substrate, wherein the color filter substrate comprises a plurality of color resist blocks and a black matrix between adjacent color resist blocks, the black matrix has a first layer and a second layer on a side of the first layer facing the array substrate, the second layer is configured to generate an invisible light under excitation of the visible light, and the first layer is configured to block transmission of the visible light and to allow transmission of the invisible light; and
    a light collimating structure on a side of the color filter substrate away from the array substrate and configured to collimate the invisible light transmitted through the first layer to form a structured light.

2. The display panel of claim 1, wherein the light collimating structure comprises:
a first substrate on the display module;
a first electrode on a side of the first substrate away from the display module;
a second substrate opposite to the first substrate;
a second electrode on a side of the second substrate facing the first substrate; and
a second liquid crystal layer between the first electrode and the second electrode, wherein liquid crystal molecules in the second liquid crystal layer are configured to be arranged in a lenticular structure when the first electrode and the second electrode are energized, to collimate the invisible light transmitted through the second layer.

3. The display panel according to claim 2, wherein the liquid crystal molecules in the second liquid crystal layer are configured to be arranged in a matrix structure when the first electrode and the second electrode are not energized.

4. The display panel according to claim 3, wherein the light collimating structure is bonded with an optical glue to a side of the color filter substrate away from the array substrate.

5. The display panel according to claim 2, wherein, in a projection obtained in a thickness direction of the display panel, a focus of the lenticular structure is located on the second layer.

6. The display panel according to claim 5, wherein, the invisible light generated by the second layer is a point light source, and the focus of the lenticular structure coincides with the point light source.

7. The display panel according to claim 6, wherein the light collimating structure is bonded with an optical glue to a side of the color filter substrate away from the array substrate.

8. The display panel according to claim 5, wherein the light collimating structure is bonded with an optical glue to a side of the color filter substrate away from the array substrate.

9. The display panel according to claim 2, wherein the light collimating structure is bonded with an optical glue to a side of the color filter substrate away from the array substrate.

10. The display panel according to claim 1, wherein the second layer is a quantum dot layer, and the quantum dot layer is configured to generate an infrared light under excitation of the visible light.

11. The display panel according to claim 10, wherein the visible light comprises a blue light portion, and the quantum dot layer is configured to generate an infrared light under excitation of the blue light portion.

12. The display panel according to claim 10, wherein the first layer is a germanium crystal layer, and the germanium crystal layer is configured to block the visible light from transmitting and transmit the infrared light.

13. The display panel according to claim 10, wherein the light collimating structure is bonded with an optical glue to a side of the color filter substrate away from the array substrate.

14. The display panel according to claim 1, wherein the light collimating structure is bonded with an optical glue to a side of the color filter substrate away from the array substrate.

15. A terminal device, comprising:
a display panel, comprising:
a backlight module configured to generate a visible light;
a display module comprising an array substrate on the backlight module, a color filter substrate opposite to the array substrate, and a first liquid crystal layer between the array substrate and the color filter substrate, wherein the color filter substrate comprises a plurality of color resist blocks and a black matrix between adjacent color resist blocks, the black matrix has a first layer and a second layer on a side of the first layer facing the array substrate, the second layer is configured to generate an invisible light under excitation of the visible light, and the first layer is configured to block transmission of the visible light and to allow transmission of the invisible light; and
a light collimating structure on a side of the color filter substrate away from the array substrate and configured to collimate the invisible light transmitted through the first layer to form a structured light, wherein the display panel is configured to project a structural light generated by the display panel onto an object under detection; and
a camera disposed on the display panel, the camera being configured to image the structural light projected on the object under detection to obtain a three-dimensional model of the object under detection.

16. The terminal device of claim 15, wherein the light collimating structure comprises:
a first substrate on the display module;
a first electrode on a side of the first substrate away from the display module;
a second substrate opposite to the first substrate;
a second electrode on a side of the second substrate facing the first substrate; and
a second liquid crystal layer between the first electrode and the second electrode, wherein liquid crystal molecules in the second liquid crystal layer are configured to be arranged in a lenticular structure when the first electrode and the second electrode are energized, to collimate the invisible light transmitted through the second layer.

17. The terminal device according to claim 16, wherein the liquid crystal molecules in the second liquid crystal layer are configured to be arranged in a matrix structure when the first electrode and the second electrode are not energized.

18. The terminal device according to claim 16, wherein, in a projection obtained in a thickness direction of the display panel, a focus of the lenticular structure is located on the second layer.

19. The terminal device according to claim 18, wherein the invisible light generated by the second layer is a point light source, and the focus of the lenticular structure coincides with the point light source.

20. The terminal device according to claim 15, wherein the second layer is a quantum dot layer, and the quantum dot layer is configured to generate an infrared light under excitation of the visible light.

* * * * *